Patented July 4, 1939

2,164,368

UNITED STATES PATENT OFFICE 2,164,368

GASKET COMPOSITION

Herbert A. Winkelmann, Chicago, Ill., assignor to Marbon Corporation, Chicago, Ill., a corporation of Delaware No Drawing. Application June 13, 1936, Serial No. 85,052

4 Claims. (Cl. 106—23)

This invention relates to a new composition particularly adapted for use in gaskets and packing.

I have found that compositions of rubber hydrohalides and asbestos may be made into gaskets and packing of high oil resistance, great toughness and strength. The compositions stabilized with the oxides of alkali earth metals will withstand exposure at elevated temperatures with little loss of strength and oil resistance.

The following examples will illustrate my invention:

Example I

| | | | |
|---|---|---|---|
| Rubber hydrochloride A | 100 | --- | --- |
| Rubber hydrochloride B | --- | 100 | 100 |
| Magnesium oxide | 20 | 10 | 10 |
| Litharge (PbO) | 20 | 20 | 20 |
| Asbestos (short fiber) | 200 | 200 | 200 |
| Graphite | --- | --- | 10 |

Rubber hydrochloride A is a substantially saturated crystalline, insoluble type rubber hydrochloride obtained by reacting sheet rubber with gaseous hydrogen chloride at elevated temperatures such as 110° C. Rubber hydrochloride B is a substantially saturated crystalline, relatively soluble rubber hydrochloride obtained by reacting sheet rubber with gaseous hydrogen chloride at —10° C.

The rubber hydrochlorides are added to a mixing roll, the magnesium oxide and litharge added, and the mixture fluxed. The asbestos is milled into the plastic mass on the rolls until a uniform composition is obtained. This composition is then molded into the desired shape of the gasket or packing by subjecting it to heat and pressure. A three minute molding at 2000 pound pressure and 270° F. is satisfactory.

Example II

Rubber hydrochloride B in amount of 100 parts by weight is fluxed on differential rolls with 10 parts of MgO and 20 parts of PbO until a uniform composition is obtained. This composition serves as a master batch and may be mixed with long fibre asbestos and toluene as follows:

| | | |
|---|---|---|
| Master batch | 10 | 10 |
| Asbestos | 40 | 90 |
| Toluene | 200 | 200 |

The toluene is evaporated from the mixture in such a manner as to give a uniform mixture of solids. This mixture is then molded into the shape of a gasket.

It is to be understood that many variations may be made without departing from the spirit of the invention. Other stabilizers than magnesium oxide, calcium oxide may be used such as sodium peroxide and magnesium carbonate, but the oxides of the alkali earth metals are preferred.

The lead oxide in the formula is not essential but acts as a stabilizer and increases the efficiency of the alkali earth stabilizers. Likewise graphite is not essential but is useful in reducing adhesion of the gaskets or packing to metal at high temperatures. Mica, talc or similar lubricating material may replace the graphite.

I claim:

1. A gasket, comprising rubber hydrochloride, asbestos and a basic heat stabilizer for said rubber hydrochloride.

2. A gasket, comprising rubber hydrochloride, asbestos, and a substance from the group consisting of basic alkali metal compounds, basic alkaline earth compounds, and basic lead compounds.

3. A gasket, comprising rubber hydrochloride, asbestos and an alkaline earth metal oxide.

4. A gasket, comprising rubber hydrochloride, asbestos, an alkaline earth metal oxide, and litharge.

HERBERT A. WINKELMANN.